United States Patent
McShane et al.

(10) Patent No.: US 10,789,547 B2
(45) Date of Patent: **\*Sep. 29, 2020**

(54) PREDICTIVE MODELING OPTIMIZATION

(71) Applicant: Business Objects Software Ltd., Dublin (IE)

(72) Inventors: Alan McShane, Baldolye (IE); Jacques Doan Huu, Guyancourt (FR); Ahmed Abdelrahman, Dublin (IE); Antoine Carme, Montigny le Bretonneux (FR); Bertrand Lamy, Paris (FR); Fadi Maali, Dublin (IE); Laya Ouologuem, Rueil Malmaison (FR); Milena Caires, Celbridge (IE); Nicolas Dulian, Houilles (FR); Erik Marcade, Paris (FR)

(73) Assignee: Business Objects Software Ltd., Dublin (IL)

( * ) Notice: Subject to any disclaimer, the term of this patent is extended or adjusted under 35 U.S.C. 154(b) by 627 days.

This patent is subject to a terminal disclaimer.

(21) Appl. No.: 15/261,215

(22) Filed: Sep. 9, 2016

(65) Prior Publication Data

US 2017/0262769 A1    Sep. 14, 2017

Related U.S. Application Data

(60) Provisional application No. 62/307,971, filed on Mar. 14, 2016, provisional application No. 62/307,671, filed on Mar. 14, 2016.

(51) Int. Cl.
*G06N 20/00* (2019.01)
*G06N 5/02* (2006.01)
(Continued)

(52) U.S. Cl.
CPC ............ *G06N 20/00* (2019.01); *G06F 9/5027* (2013.01); *G06F 9/54* (2013.01); *G06N 5/022* (2013.01)

(58) Field of Classification Search
CPC ...... G06N 20/00; G06N 5/022; G06F 9/5027; G06F 9/54
See application file for complete search history.

(56) References Cited

U.S. PATENT DOCUMENTS 5,241,620 A * 8/1993 Ruggiero .............. G06F 17/246
706/16
5,784,596 A * 7/1998 Melamed ............... G05B 17/02
700/29
(Continued)

FOREIGN PATENT DOCUMENTS

CN            104899561           9/2015

OTHER PUBLICATIONS

Shyam R, et al., "Apache Spark a Big Data Analytics Platform for Smart Grid", Procedia Technology 21 (2015) 171-178 [hereafter Shyam-R] (Year: 2015).*

(Continued)

*Primary Examiner* — Robert A Cassity
*Assistant Examiner* — Tsu-Chang Lee
(74) *Attorney, Agent, or Firm* — Fish & Richardson P.C.

(57) ABSTRACT

Techniques are described for identifying an input training dataset stored within an underlying data platform; and transmitting instructions to the data platform, the instructions being executable by the data platform to train a predictive model based on the input training dataset by delegating one or more data processing operations to a plurality of nodes across the data platform.

16 Claims, 12 Drawing Sheets

(51) Int. Cl.
*G06F 9/50* (2006.01)
*G06F 9/54* (2006.01)

(56) References Cited

U.S. PATENT DOCUMENTS

| | | | | |
|---|---|---|---|---|
| 6,263,337 | B1* | 7/2001 | Fayyad | G06K 9/6223 |
| 8,489,632 | B1* | 7/2013 | Breckenridge | G06K 9/6288 |
| | | | | 707/778 |
| 2007/0016542 | A1* | 1/2007 | Rosauer | G06N 5/022 |
| | | | | 706/21 |
| 2010/0153444 | A1* | 6/2010 | Nayak | G06Q 10/10 |
| | | | | 707/770 |
| 2011/0225293 | A1* | 9/2011 | Rathod | G06Q 10/00 |
| | | | | 709/224 |
| 2012/0022952 | A1* | 1/2012 | Cetin | G06Q 10/04 |
| | | | | 705/14.73 |
| 2013/0290223 | A1* | 10/2013 | Chapelle | G06N 20/00 |
| | | | | 706/12 |
| 2015/0052144 | A1 | 2/2015 | Mari | |
| 2015/0261846 | A1 | 9/2015 | Hall et al. | |
| 2015/0302015 | A1 | 10/2015 | Saurel et al. | |
| 2015/0379430 | A1* | 12/2015 | Dirac | G06N 20/00 |
| | | | | 706/12 |
| 2017/0148264 | A1 | 5/2017 | Pichette et al. | |
| 2017/0264670 | A1 | 9/2017 | Huu et al. | |

OTHER PUBLICATIONS

Arno Candel et al. "Deep Learning with H2O", Feb. 2015: Second Edition, Feb. 28, 2015, pp. 1-31, XP0155458761, Retrieved from the Internet on Mar. 13, 2018 URL: https://raw.githubusercontent.com/h2oai/h2o/master/docs/deeplearning/DeepLearningBookletV1.pdf.

Communication from EPO dated Mar. 26, 2018 for EPO Application No. 16002730.6-1221; 13 pages.

U.S. Office Action (Final) in U.S. Appl. No. 15/261,194, dated Nov. 1, 2018, 26 pages.

U.S. Office Action (Non-Final) in U.S. Appl. No. 15/261,194, dated Mar. 30, 2018, 14 pages.

Communication and extended European Search Report dated Jul. 21, 2017 related to EPO Application No. 16002730.6-1879; 12 pages.

Anonymous: "Transfer Learning", Course Notes CS231n Convolutional Neural Networks for Visual Recognition retrieved from the Internet on Jul. 7, 2017, <http://web.archive.org/web/20160312035131/http://cs231n.github.io/transfer-learning/>4 pages.

Kwon Young-Woo et al: "Reducing the Energy Consumption of Mobile Applications Behind the Scenes", 2013 IEEE International Conference on Software Maintenance, IEEE, Sep. 22, 2013, pp. 170-179, XP032528475; 10 pages.

Gamma E. et al.: "Design Patterns: Elements of Reusable Object-Oriented Software", Chapter 3, Creational Patterns; Sep. 1, 1999, pp. 81-136, XP002207989 (142 pages).

Communication from EPO dated Jul. 17, 2017 for Extended Duropean Search Report; 12 pages.

Andrew S. Tanenbaum: "Distributed Systems: Principles and Paradigms (2nd Edition)" Oct. 12, 2006, Printice Hall, XP055115159; pp. 0-26.

Zhang Xuefu: "Apache Hive on Apache Spark: Motivations and Design Principles", Cloudera Engineering Blog, Jul. 1, 2014; pp. 1-12, XP0555388071; Retrieved from Internet on Jul. 5, 2017: http://blog.cloudera.com/blog/2014/07/apache-hive-on-apache-spark-motivations-and-design-principles/.

Lambda Architecture for Big Data Systems; Data Science Central, the Online Resource for Big Data Practitioners; 6 pages; Retrieved from Internet on Nov. 19, 2014; http://lambda.com/profiles/blogs/lambda-architecture-for-big-data-systems.

* cited by examiner

PREDICTIVE MODELING OPTIMIZATION

CROSS-REFERENCE TO RELATED APPLICATION

The present application claims priority to U.S. Provisional Patent Application Ser. No. 62/307,971 titled "Predictive Modeling Optimization," and to U.S. Provisional Patent Application Ser. No. 62/307,671 titled "Unified Client for Distributed Processing Platform," both of which were filed on Mar. 14, 2016. The entirety of both of these provisional applications are hereby incorporated by reference into the present application. The present application is related to U.S. Patent Application No. 62,307,671 titled "Unified Client for Distributed Processing Platform," which was filed on Mar. 14, 2016, the entirety of which is hereby incorporated by reference into the present application.

FIELD

The present specification relates to optimizing predictive modeling.

BACKGROUND

Predictive modeling is a process to leverage statistics and mathematical methods to analyze data, find patterns and produce models that can help predict a particular outcome. The predictive models are typically built on a sample of historic data and can then be applied to a different dataset, typically with current data or events, for a business purpose.

SUMMARY

Innovative aspects of the subject matter described in this specification may be embodied in methods that include the actions of identifying an input training dataset stored within an underlying data platform; and transmitting instructions to the data platform, the instructions being executable by the data platform to train a predictive model based on the input training dataset by delegating one or more data processing operations to a plurality of nodes across the data platform. Other embodiments of these aspects include corresponding systems, apparatus, and computer programs, configured to perform the actions of the methods, encoded on computer storage devices.

These and other embodiments may each optionally include one or more of the following features. For instance, applying the predictive model to a business dataset to identify one or more results each associated with a probability of occurrence. The data platform includes an open source cluster computing framework. The open source cluster computing framework includes Apache Spark. The method is independent of data transfer of the input training dataset from the data platform. The one or more processing operations include calculating one or more statistics associated with the input training dataset to reduce a number of variables for generating the predictive model. The one or more processing operations include encoding data of the input training dataset including converting alphanumeric data to numeric data. The one or more processing operations include performing a co-variance matrix calculation and a matrix inversion calculation with respect to the input training dataset. The one or more processing operations include slicing the input training dataset, and scoring the predictive model with respect to the slices. The one or more processing operations include re-calculating the one or more statistics based on the one or more results. The one or more processing operations include iteratively evaluating a performance of the predictive model based on a structural risk minimization.

Particular implementations of the subject matter described in this specification can be implemented so as to realize one or more of the following advantages. For example, a learning phase of the predictive modeling can be reduced, typically by a factor of ten or more, compared to traditional learning techniques. The performance and scalability limitations present in traditional learning techniques may be shifted from the predictive server or desktop to the database server or data platform such as a distributed processing platform (e.g., Apache Hadoop). Implementations of the subject matter can be introduced to existing predictive modeling software without major architectural changes. The data transfer requirements can be reduced or eliminated compared to traditional learning techniques, and thus, the training can be done on much bigger datasets and the solution can scale to Big Data. Optimizing the training process also enables scalability to wider datasets (e.g., created during the data preparation phase). For example, 50,000 column training datasets may be employed in implementations to train a predictive model.

Moreover, traditional training of models may typically be performed on the client side, thus requiring large datasets to be communicated from data storage to the client, and thus consuming large amounts of network bandwidth. In some implementations, at least some of the processing is performed on the distributed processing platform (e.g., a Hadoop cluster), and some is performed by the client application (e.g., modeler), thus reducing the amount of network bandwidth needed to transfer large datasets to the client application and perform modeling jobs solely on the client side. In some instances, the more data-intensive and/or processing intensive processing steps may be performed on the cluster to take advantage of greater processing capabilities of the cluster. Moreover, because the cluster may be closer to the data storage in a network topology, performing more data intensive operations of the cluster may avoid consuming network bandwidth that would otherwise be consumed by communicating large amounts of data back and forth between the data storage and the modeler, as may occur using traditional training techniques. Implementations may also provide advantages for security, given that in-database (e.g., on-cluster) analysis may avoid communicating data over possibly insecure communication channels. Moreover, sensitive and/or private data such as personality identifiable information (PII) may be more securely handled on the cluster than on other systems.

Implementations also provide further advantages regarding the machine learning that may be employed in predictive modeling. For example, at least some of the more complex and/or processing-intensive internal steps used in the machine learning, such as encoding and/or other data preparation operations, may be performed without any user interaction, e.g., such steps may be hidden from the end-user. Implementations may also employ one or more optimizations, which may be implemented lazily. Such optimization(s) can include reducing the dimensionality of the datasets being analyzed, to provide for high performance of the modeler. Per the principle of structural risk minimization (SRM), a simpler model (e.g., with reduced dimensionality) may be generally more useful and robust in handling new data, given that the model may not become too strongly tailored to the particular training set used to train the model.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
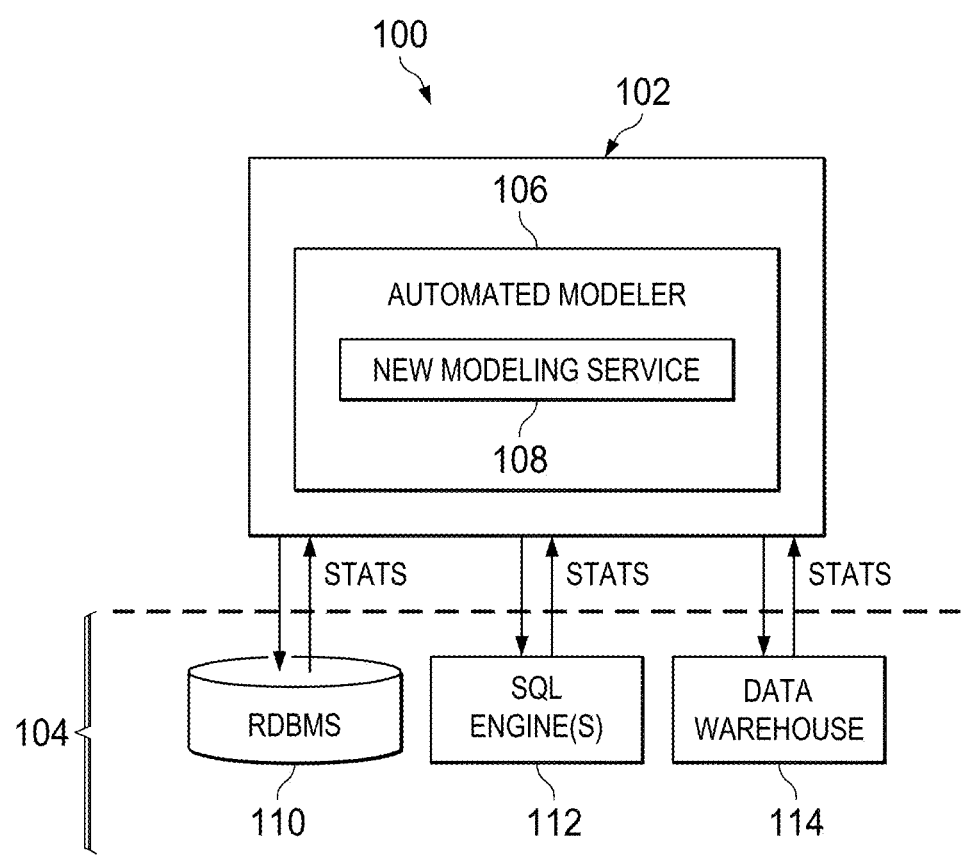
FIGS. 1 and 2 depict example environments for in-database modeling.

There are many different approaches to predictive modeling. For example, regression modeling predicts a value, while classification distinguishes hidden groups in the data. Additionally, there is a large number of machine learning algorithms, techniques, and implementations that vary between off-the-shelf (for example, the k-means algorithm in R) to proprietary approaches. In particular, proprietary approaches can leverage machine learning techniques such as Vapnik-Chervonenkis theory and Structural Risk Minimization to build better quality and more generally applicable models. The quality and robustness of the model can be analyzed based on i) quality, e.g., how well a model describe the existing data—this is achieved by minimizing the empirical error; and ii) reliability or robustness: how well a model will predict when applied to new data—this is achieved by minimizing the unreliability. In terms of predictive modeling, traditional predictive modeling solutions rely on database connectivity such as open database connectivity (OBDC) and java database connectivity (JDBC) to connect to a relational database management system (RDBMS), pull the data back into memory and then process that data.

To that end, predictive modeling, can be data intensive. Specifically, the data preparation phase and the learning (training) phase can require many sweeps of the same data and many calculations on each individual input parameters. For example, a cross statistics step in an algorithm can require statistics to be calculated on every input variable with every target variable. As shown by the table below, for an input dataset with N input variables, T target variables and R rows, the cross statistics calculation is done N×T×R times.

| Row number | Input variable 1 | Input variable 2 | Input variable 3 | Input variable N | Target variable 1 | Target variable 2 |
|---|---|---|---|---|---|---|
| 1 | A | 12 | 76.2 | Complete | 99.67 | Product D |
| 2 | R | 87 | 98.2 | Ready | 142.32 | Product X |
| ... | | | | | | |
| R | B | 4 | 62.5 | Complete | 150.1 | Product A |

The traditional architectural design utilizes a tiered approach, with data sources on one layer and data processing on another architectural layer. The separation can also be represented in the landscape with the data residing in a database (a database server computer or server cluster) and the data processing on a separate machine (e.g., a server or desktop computer). In some examples, the communication between the layers is done via SQL and the connectivity is enabled using technologies such as JDBC and ODBC. However, when this architecture is applied to predictive modeling software, it introduces performance and scalability limitations due to the requirement to transfer the entire training dataset from the database across the network to a different machine for processing. To that end, depending on the algorithms or approaches employed, the performance penalty of the data transfer of the full training dataset can happen multiple times in the learning (training) phase. Furthermore, in some examples, the architecture that relies on data transfer can limit the performance and scalability as the data processing is happening on typically less capable hardware such as a user's desktop computer or a single server computer when compared to the much more capable processing power of a database server/cluster or Apache Hadoop cluster. Additionally, the data transfer approach may not scale well with growing throughput requirements, for example, the number of models to be built in a day and the number of users in the system building models.

Implementations provide for automatic, in-database predictive modeling that overcomes or at least mitigates the shortcomings of traditional architectural design. Such modeling may be performed in a Big Data environment to overcome the performance and scalability limitations of modeling within a traditional architecture, such as the limitations described above. Traditional modeling may be performed on the client side, thus requiring large datasets to be communicated from data storage to the client, and thus consuming large amounts of network bandwidth. In some implementations, at least some of the processing is performed on the cluster, and some is performed by the client application (e.g., modeler), thus reducing the amount of network bandwidth needed to transfer large datasets to the client application and perform modeling jobs solely on the client side. In some instances, the more data-intensive and/or processing intensive processing steps may be performed on the cluster to take advantage of greater processing capabilities of the cluster. Moreover, because the cluster may be closer to the data storage in a network topology, performing more data intensive operations of the cluster may avoid consuming network bandwidth that would otherwise be consumed by communicating large amounts of data back and forth between the data storage and the modeler. As described herein, in-database modeling may be modeling that is performed at least partly in a cluster (e.g., a distributed processing platform) where the data being analyzed is also stored. Accordingly, in-database modeling may provide advantages for security, given that in-database analysis may avoid communicating data over possibly insecure communication channels. Moreover, sensitive and/or private data such as personality identifiable information (PII) may be more securely handled on the cluster than on other systems.

In-Database Modeling

FIG. 1 illustrates an example environment 100 for in-database modeling. Specifically, the environment 100 includes a server computing system 102, and a data platform 104. The server computing system 102 can include one or more computing systems, including a cluster of computing systems. The data platform 104 can include one or more computing systems (e.g., nodes), including multiple user-based computing systems. The server computing system 102 can include an automated modeler 106 that includes a modeling service 108. The data platform 104 can include a RDBMS 110, one or more Standard Query Language (SQL) engines 112, and a data warehouse 114. The engines 112 may be described as Big Data SQL engines. In some examples, the engines 112 can include Apache Spark, or Apache Hive. Although implementations of the present disclosure are discussed herein with reference to data platform 104 that is an example distributed processing platform, e.g., the Hadoop framework developed by the Apache Software Foundation, it is contemplated that implementations of the present disclosure can be realized using any appropriate distributed processing platform. Although the server computing system 102 is described as a server, the system 102 and/or the modeling service 108 may act as a client in its interactions with the data platform 104.

Figure 2:
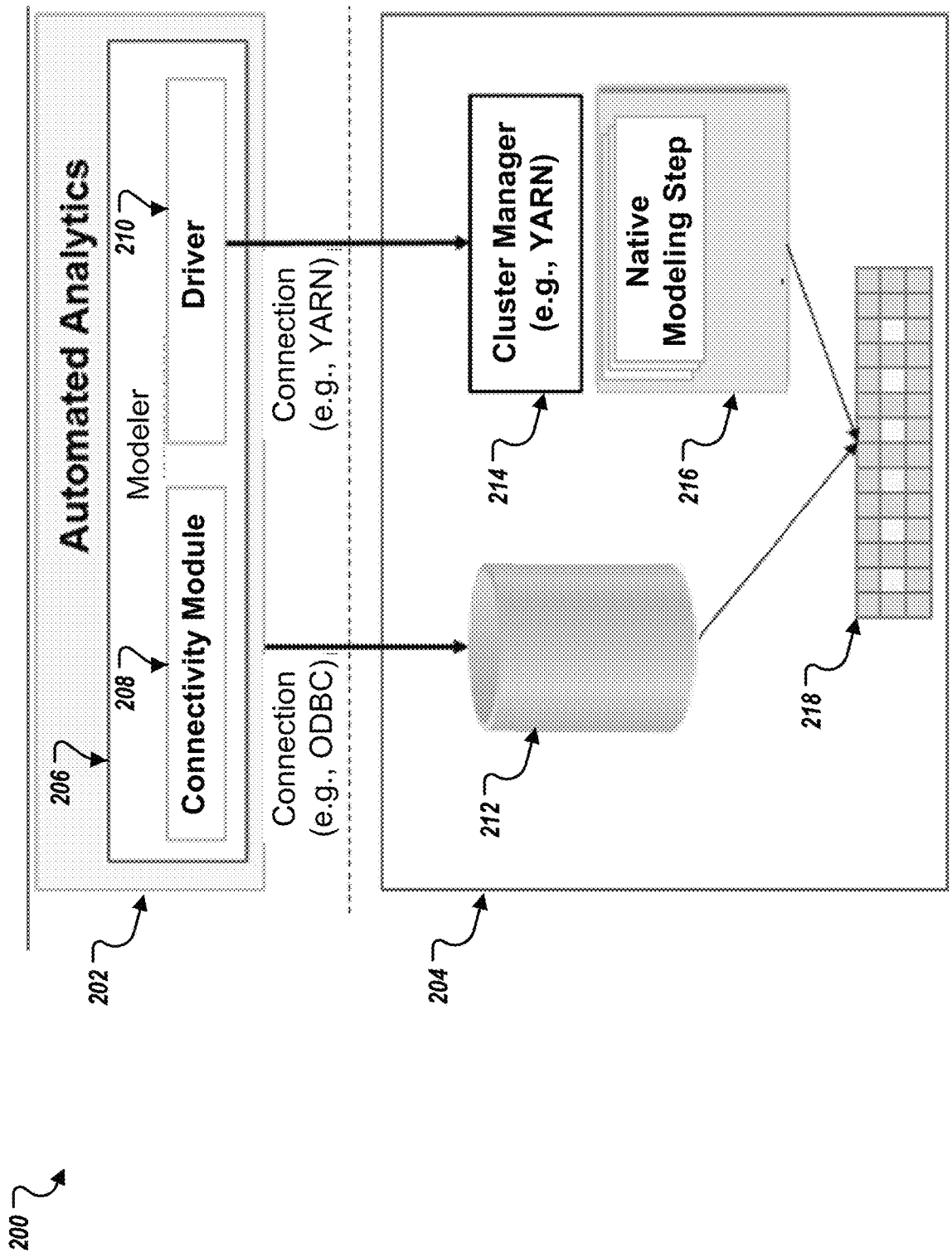

FIG. 2 illustrates an example environment 200 for in-database modeling, similar to the environment 100. The environment 200 includes an automated analytics module 202 and a cluster 204. The cluster 204 may comprise a distributed processing platform for data processing. In some implementations, the cluster 204 is an Apache Hadoop cluster. The automated analytics module 202 includes a modeler 206. In some implementations, the modeler 206 is a C++ modeler. The modeler 202 may include a connectivity module 208 and a driver 210. In some implementations, the connectivity module 208 is an ODBC connectivity module. In some implementations, the driver 210 is a Spark Driver (JNI) module. In some instances, the cluster 204 includes a data warehouse 212, a cluster manager 214, a module 216 that is associated with native modeling steps, and a distributed file system 218. In some implementations, the data warehouse 212 is an Apache Hive data warehouse. The connectivity module 208 may establish a connection (e.g., ODBC connection) to the data warehouse 212. In some implementations, the cluster manager 214 is a YARN cluster manager. The driver 210 may create a (e.g., YARN) connection to the cluster manager 214. In some implementations, the module 216 is an Apache Spark module, and the associated modeling steps are native Spark modeling steps. In some implementations, the file system is an Apache Hadoop distributed file system (HDFS). In some implementations, the automated analytics module 202 is in communication with the cluster 204. In particular, connectivity module 208 is in communication with the (e.g., Apache Hive) data warehouse 212 and the (e.g., Spark) driver 210 is in communication with the (e.g., YARN) cluster manager 214. An input training dataset (e.g., a business dataset) can be transferred via the connectivity module 208 and/or the driver 210, over one or both of the connections established by those modules. Furthermore, the data warehouse 212 and the module 216 can communicate with the distributed file system 218, e.g., for in-database modeling. In some implementations, the communications between the cluster 202 and the automated analytics module 202 may employ the unified client, as described below.

The analytics module 202 may use an ODBC connection to interact with the (e.g., Hive) data warehouse 212 to retrieve result sets of processing performed on the cluster 204 by the native modeling step(s), e.g., Spark job(s). The YARN connection may be employed to request that jobs be run, e.g., through native modeling steps, on the cluster 204. The results of the native modeling steps (e.g., the Spark job(s)) may be written to the file system 218 (e.g., HDFS). In some instances, the results may be copied from the file system 218 to the data warehouse 212 to be accessible by the automated analytics module 202 through the unified client.

In some examples, the in-database modeling performed by the environment 100 can be associated with an approach to perform the data processing close to the source of the data. In some examples, in-database modeling of the environment 100 is associated with the use of in-database processing for predictive modeling. The predictive modeling can include generating database specific code (e.g., SQL or stored procedures) to delegate the modeling process (e.g., within the environment 100) in a language that is optimized for the data platform 104.

In some examples, the in-database modeling that is associated with the environment 100 can include a data preparation phase, a learning (training) phase, a scoring phase, and/or a retraining phase. The data preparation phase is associated with cleansing of the data and handling of outliers associated with the data. The data preparation phase can also involve increasing the number of input variables using data manipulation (e.g., by using SQL window functions) to facilitate finding patterns in the data. For example, finding patterns of buying behavior across a month as opposed to patterns at minute level. The learning (training) phase is associated with application of algorithms and techniques to an input training dataset. In some examples, the process of building models can be iterative to identify an appropriate model. This can be performed through software or through manually changing model inputs using business domain knowledge. Additionally, the learning (training) phase can be associated with such concepts as over-fitting and robustness. Furthermore, the result of the model building can include an output that can be used in the scoring phase. The scoring phase is associated with application of the training model. The model can be embedded in business applications or used as a micro-service to predict results for a given input. The retraining phase is associated with ensuring that the existing models are accurate and providing accurate predictions with new data, including model comparison and retriggering of the learning process taking into account more recent data.

Performance Characteristics of In-Database Modeling

In some implementations, the data preparation phase of the in-database modeling can increase the number of input variables to produce statistically more robust models with better lift. For example, increasing the number of input variables (e.g., columns) ten-fold for a data source from 200 to 2,000 variables can be used to find patterns across time windows of minutes or days. In some examples, the data manipulation functionality can use SQL processing in the modeling software to produce the extra input variables. As a result, this correspondingly increases the size of the data and performance demands of the learning process.

In some implementations, an automated machine learning approach that requires minimal input and minimal machine learning knowledge from the user during the model learning/training phase, such as Structural Risk Minimization, enables scalability for higher throughput and a simpler process overall providing more roles in the enterprise to use predictive modeling. The result of the automated model building process can use quantitative measures to indicate the model quality (error) and robustness (for new datasets) to help the user find the best models.

In some implementations, the in-database modeling approach provides delegation of the data intensive steps of the predictive modeling process to the underlying data platform, such as an Apache Hadoop cluster and/or a database. The data intensive steps are primarily the steps that require full training dataset data transfer. In some implementations, the in-database modeling approach minimizes a number of processing steps, including re-use of the results from the learning (training) phase in the data source (e.g., underlying data platform). As a result, this reduces processing costs of recalculation in subsequent steps. For example, the results of the processing steps can be cached (stored in temporary tables) for later re-use.

In some implementations, the parameters associated with the data sources (e.g., the client computing systems 104 and/or the data warehouse 114) can be utilized to facilitate the in-database modeling. In some examples, the database platforms associated with the client computing systems 104 can include native low-level language libraries (e.g., in C++) and the functionality thereof can be leveraged to support the in-database modeling. For example, as described further below, the co-variance matrix calculation step can be delegated to Apache Spark MLLib (machine learning library) when running against a (e.g., Big Data) data source. Furthermore, in some examples, the RDBMS 100, such as Teradata, includes functionality to optimize matrix calculations.

In some implementations, the steps of the in-database modeling can be recorded to enable performance turning of the in-database modeling, with such steps including execution time, CPU and memory footprint. In some implementations, the in-database modeling can be transparent to an end-user utilizing existing software, thus providing use of the same (or similar) user interfaces and database connectivity.

In some implementation, the configuration can be used to further tune the execution of individual modeling steps in the data source to further help performance. For example, when modeling steps are delegated to Apache Spark, the number of Spark executors, the number of cores and the memory allocated can be fine-tuned.

Process Flow of In-Database Modeling

Linear or polynomial regression analysis can be used to estimate the relationships between variables and form the basis of the regression and classification model building. A linear regression model is expressed in the form:

$$Y = b_0 + b_1 X_1 + b_2 X_2 + b_3 X_3 + \ldots$$

where X1, X2, X3 . . . are predictor variables (features) and Y is the target variable.

The linear regression model is defined when the coefficients corresponding to each variable (b1, b2, b3 . . . ) and the intercept (b0) are known.

Figure 3A:
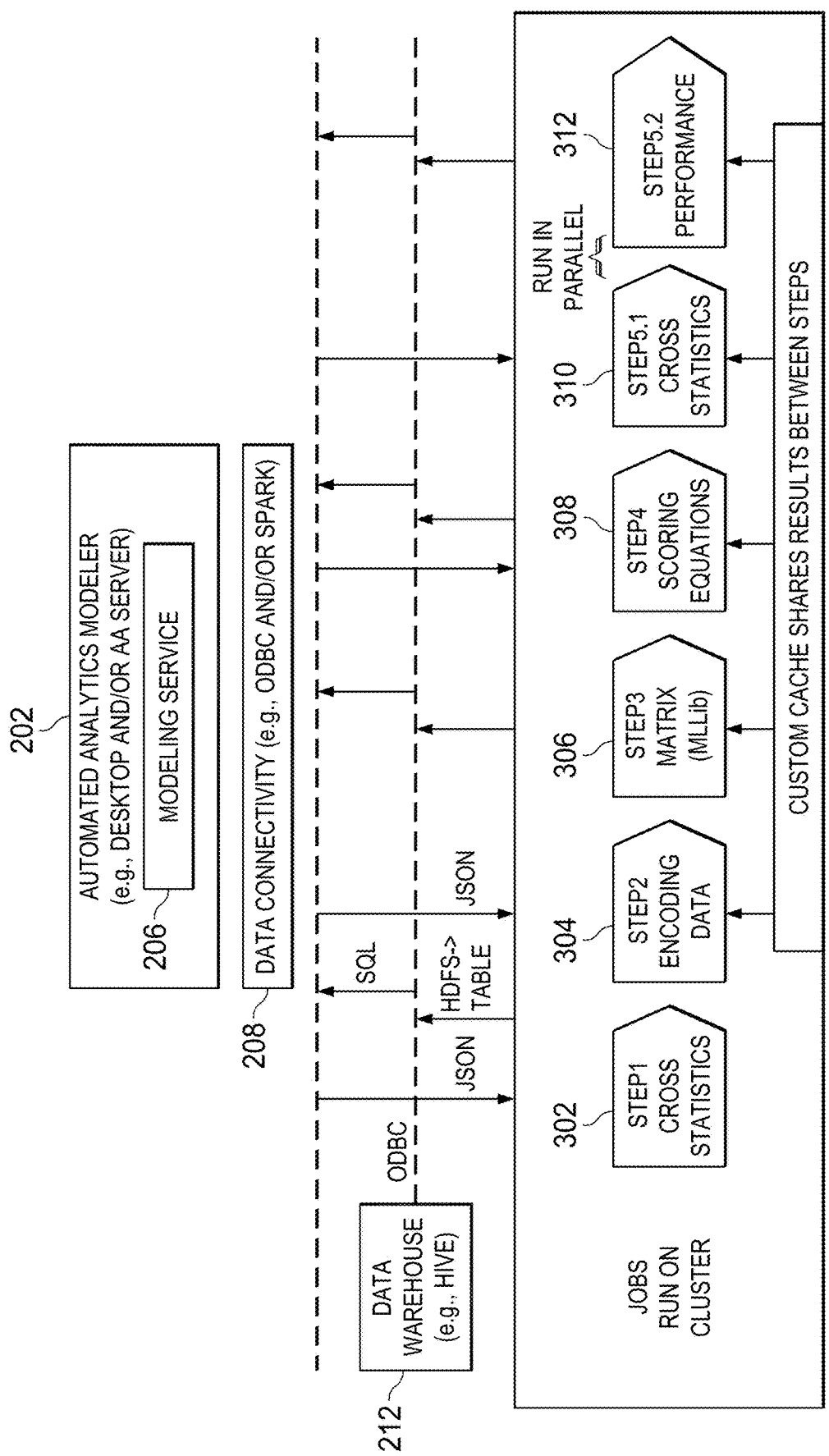
FIGS. 3A-3D depict example process flows of in-database modeling.

FIG. 3A illustrates an example process flow 300 of an in-database modeling, e.g., as performed by the environment 100 and/or the environment 200. At step 302, a data preparation and cross statistics calculation of the data is performed. For example, data manipulations are applied to increase the number of input variables, typically using SQL. Furthermore, data manipulations can include combining input variables. For example, combining variables "age" and "marital-status" together as they may have more predictive influence on a target variable "salary."

Data preparation can further include slicing the data into slices such that model results from one slice can be compared to another slice as part of the learning (training) phase to check for robustness. Data preparation can further include coping with data outlier's such as "null" values in a database. In some examples, such values can be maintained and classified. Data preparation can further include variable binning to reduce the number of discrete values associated with the data and place values having close or related values into groups (e.g., bins). Cross statistics calculation of the data can include calculating statistics such as the counts and distribution of particular input variable values against each target variable. This can be used to facilitate the variable reduction process to reduce the number of input variables.

At step 304, data encoding is performed. Specifically, data encoding turns alphanumeric data into numbers. For example, a sample SQL formula to encode the "age" variable is (AGE−avg (AGE))/SQRT(VAR(AGE)).

At step 306, co-variance matrix calculation is performed. The covariance matrix is a matrix whose element in the i, j position is the covariance between the i'th and j'th variables. For example, the covariance between variable X1 and variable X2 is defined as:

$$\text{Cov}(X_1, X_2) = \frac{1}{m} \sum_{i=1}^{m} (X_1^i - \overline{X_1})(X_2^i - \overline{X_2})$$

Additionally, a matrix inversion calculation is performed. Specifically, the coefficients can be calculated using:

$$C\hat{\beta} = (\text{Cov}(X_i, y))'$$

where C is the covariance matrix of all predictors, β^ is a vector of coefficients (b1, b2, . . . ) and Z' represents the transpose of matrix Z. The constant term, b0, is the difference between the mean of y and the mean values predicted from the estimates, Xβ^.

At step 308, scoring the predictive model against the data slices previously generated to check for robustness of the predictive model is performed. At step 310, recalculation of the cross statistics with the predicted values is performed. At step 312, performance comparisons are performed. Specifically, the performance of the predictive model is iteratively evaluated based on a structural risk minimization. In some implementations, the results of the processing steps can be cached (stored in temporary tables) for later re-use and/or use by other steps. As shown in the example of FIG. 3A, a (e.g., custom) cache may enable the results to be shared between the various processing steps. Although the example of FIG. 3A depicts the use of ODBC, JSON, SQL, and HDFS, for data connectivity, connection format, query language, and file system respectively, implementations support the use of other technologies, protocols, and/or formats. As appropriate, data processing steps may be performed in parallel on the cluster, such as the example of steps 310 and 312 shown in FIG. 3A. For example, multiple Spark jobs may be run in parallel by multiple Spark instances executing within the cluster.

Figure 3B:
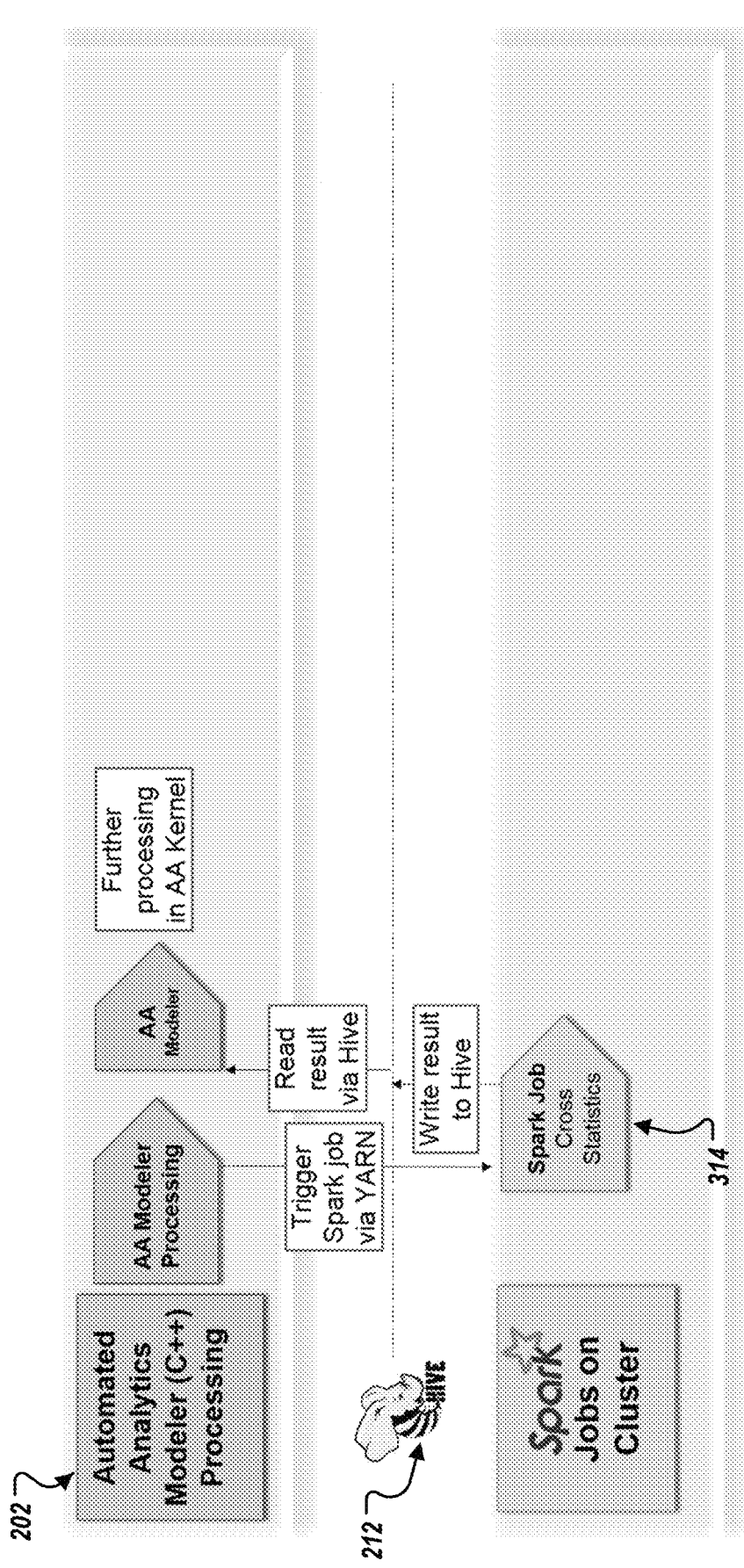
Figure 3C:
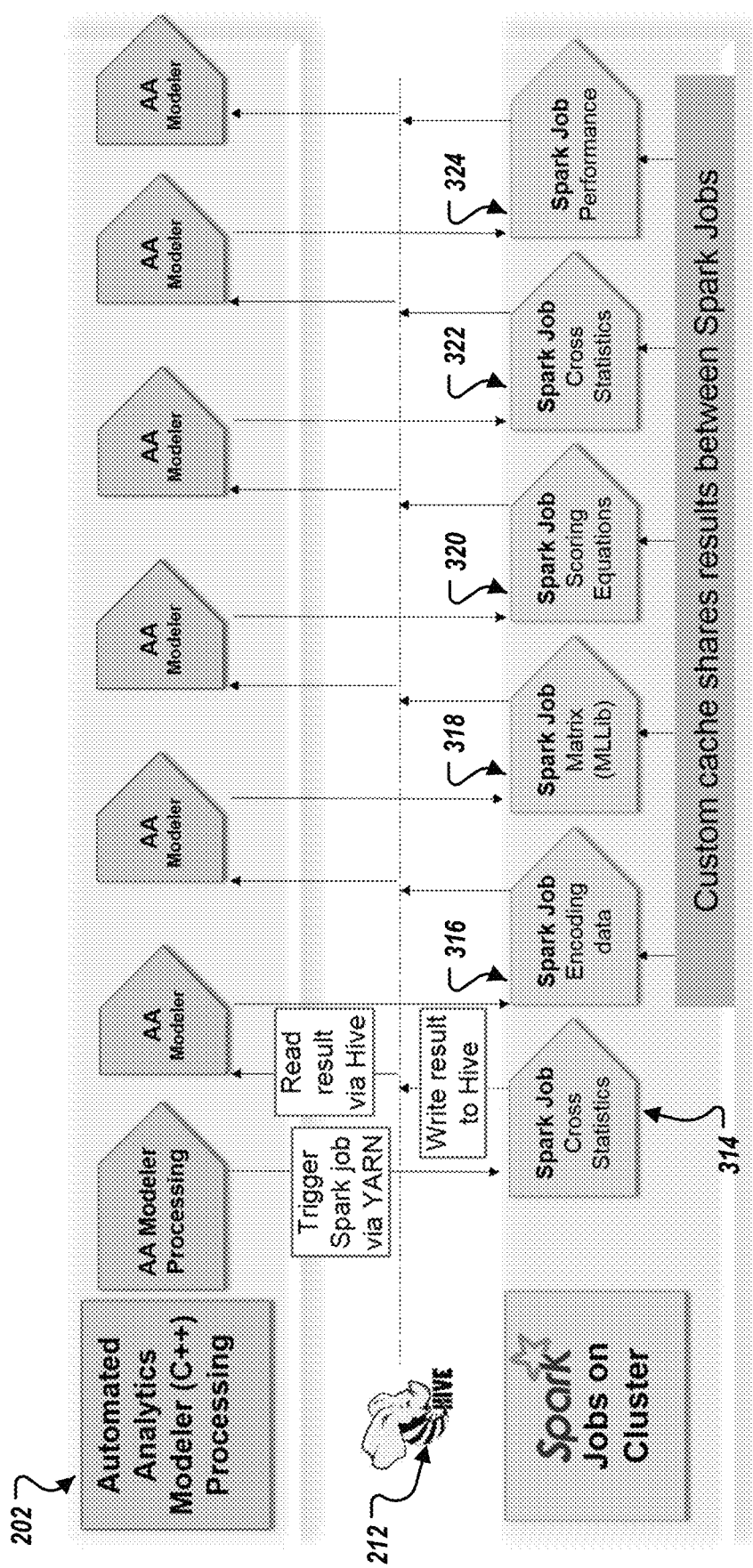
Figure 3D:
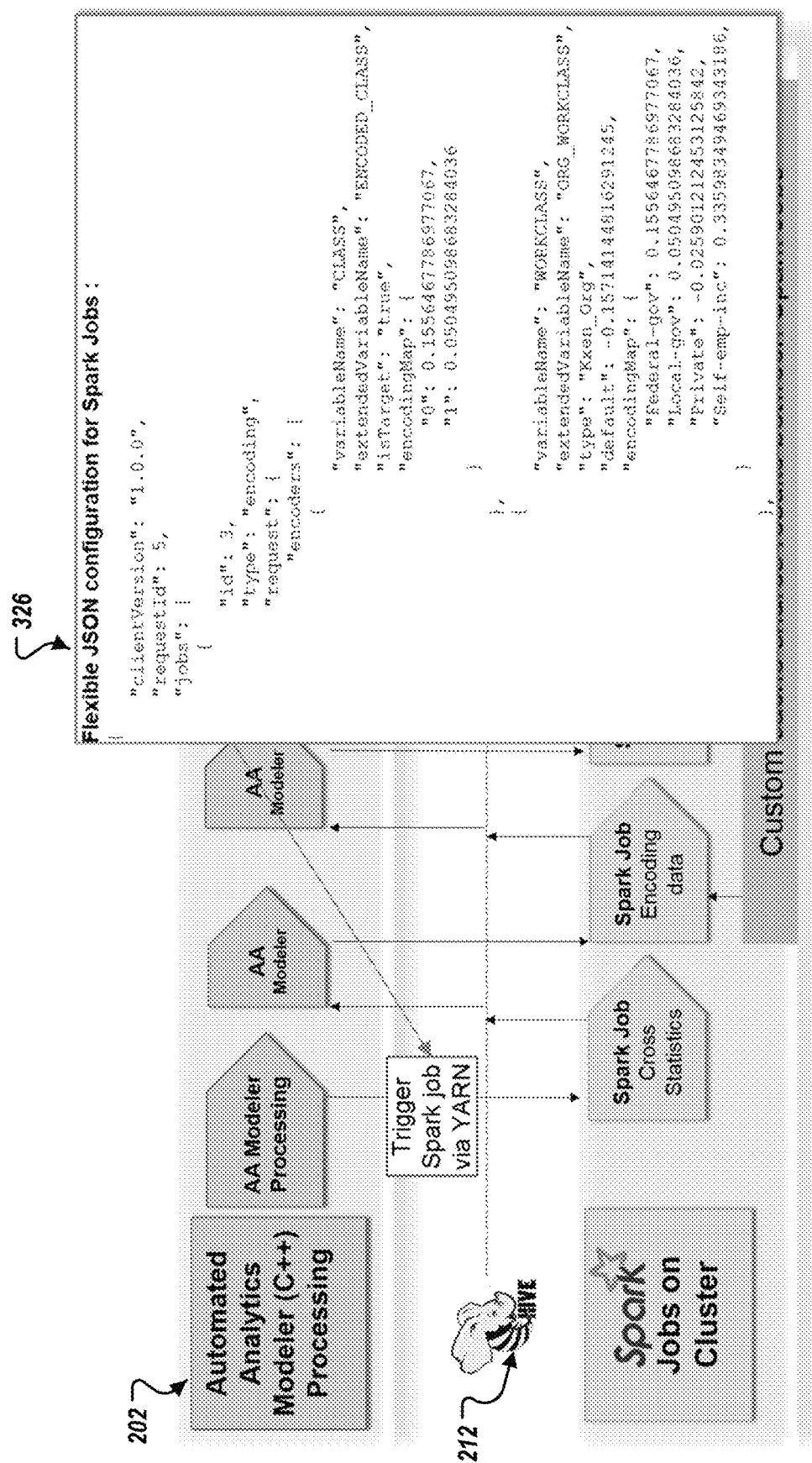

FIGS. 3B-3D illustrate example process flows for in-database modeling. In these examples, at least a portion of the data processing is performed on the client-side, e.g., on an application or other client process that is separate from the cluster. For example, at least a portion of the processing may be performed by an automated analytics modeler 202. In the examples of FIGS. 3B-3D, the automated analytics modeler 202 is a C++ modeler. In some implementations, the modeler 202 may employ a unified client to interact with the cluster, e.g., with a distributed processing platform such as a Hadoop cluster. Operations of the unified client with respect to the cluster are described further below.

The modeler 202 may employ the unified client to request various jobs to be run on the cluster, in serial or in parallel. In the example of FIGS. 3B-3D, the jobs are Spark jobs. Such jobs may be requested by the modeler 202 through a unified client that includes a Spark client as a sub-client, as described below. Other types of jobs may also be run to perform various data processing steps. In some implementations, results of various steps may be stored in the data warehouse 212, and the modeler 202 may retrieve the results from the data warehouse 212. In the example of FIGS. 3B-3D, the data warehouse 212 is a Hive data warehouse. Implementations also support the use of other types of data warehouses.

As shown in FIG. 3B, the modeler 202 may request (e.g., trigger) a Spark job through the (e.g., YARN) driver 210, and the Spark job 314 (e.g., cross statistics) may be executed on the cluster. The results of the job may be written to the (e.g., Hive) data warehouse 212, and the modeler 202 may read the results from the data warehouse 212. Further processing may then be performed.

As shown in FIG. 3C, the further processing may include any appropriate number of type of jobs executed on the cluster. As shown in the example, the jobs may include a job 316 for encoding data, a job 318 for matrix processing (e.g., using MLLib), a job 320 for scoring equations, another job 322 for cross statistics, and a job 324 for performance. Other types of jobs are also supported by implementations. After each job, the results of that data processing step may be written to the data warehouse 212. The modeler 202 may retrieve the results from the data warehouse 212, perform some location processing, and based on the results of the local processing determine another job to be performed on the cluster. In this manner, the modeler 202 may perform local data processing while using the cluster to perform certain data processing steps as appropriate. In some implementations, a (e.g., custom) cache may be employed to share results between the jobs executed on the cluster, as described with reference to FIG. 3A. In some implementations, the cache is a workspace used by the unified client as described below.

In some implementations, a flexible configuration may be employed to specify jobs to be executed on the cluster. FIG. 3D illustrates an example of JSON-formatted metadata that may be used to configure an example Spark job. Other file formats may also be employed to configure the jobs. In some implementations, the format and/or schema of the metadata is flexible and/or generic across multiple jobs, or for all jobs. Accordingly, a new job may reuse the same schema and/or same type of schema.

Process for in-Database Modeling

Figure 4:
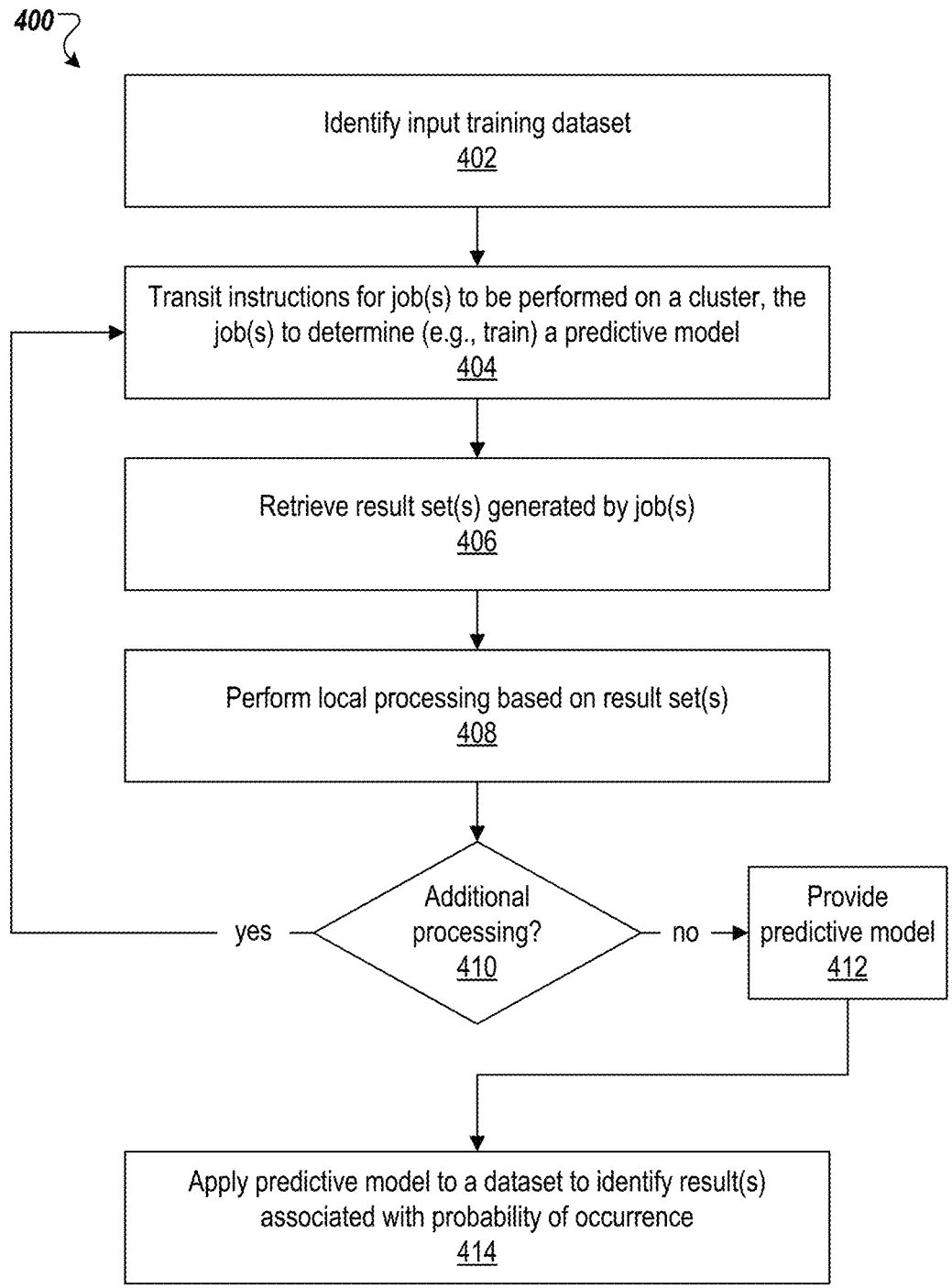
FIG. 4 depicts an example process for in-database modeling.

FIG. 4 illustrates an example process 400 for in-database modeling. The process 400 can be performed, for example, by the environment 100 and/or the environment 200, or another data processing apparatus. The process 400 can also be implemented as instructions stored on computer storage medium, and execution of the instructions by one or more data processing apparatus cause the one or more data processing apparatus to perform some or all of the operations of the process 400.

An input training dataset stored within an underlying data platform is identified (402). Instructions are transmitted to the data platform, the instructions being executable by the data platform to train a predictive model based on the input training dataset by delegating one or more data processing operations to a plurality of nodes across the data platform (404). In some implementations, the instructions may specify a data processing job to be performed on the cluster 204 to train or otherwise determine a predictive model, as in the examples of FIGS. 3A-3D. The result set(s) of the job(s) may be retrieved (406) from the data warehouse 212. In some instances, local processing (e.g., on the client-side modeler) may be performed (408) based at least partly on the retrieved result set(s). A determination may be made (410) whether additional processing jobs are to be performed to determine the predictive model. If so, the process may return to 404 and another set of instructions may be transmitted to request a job to be executed on the cluster 204, and/or additional local processing may be performed. If no additional processing is to be performed to determine the predictive model, the predictive model may be provided (412). The predictive model may be applied (414) to a dataset (e.g., a business dataset) to make predictions regarding the data, e.g., to identify result(s) associated with a probability of subsequent occurrence of particular data values in the dataset.

Although FIG. 4 depicts an example in which processing is performed in a particular order (e.g., first a job run on the cluster, then local processing) and serially, implementations are not so limited. Implementations support modeling that includes any number of data processing steps (jobs) that are performed on the cluster 204 or locally on the automated analytics module 202, and that may be performed serially or in parallel.

Unified Client

A distributed processing platform, such as that used to perform the modeling described herein, may store and process large datasets in a batch mode. In the example of Hadoop, the Hadoop ecosystem initially included MapReduce and Hadoop Distributed File System (HDFS), and has grown steadily over time to support other processing engines (e.g., Hive, Impala, Spark, Tez, etc.), other languages (e.g., PIG, HQL, HiveQL, SQL, etc.), and other storage schema (e.g., Parquet, etc.). In particular, the addition of the Spark engine has dramatically improved the distributed processing efficiency of Hadoop compared to its previous version that supported the MapReduce architecture but not Spark. The Spark engine can handle complex processing with many underlying iterations, such as those employed in machine learning.

By supporting a technological "zoo" of many different processing engines, languages, and storage schema, a distributed processing platform presents an engineering challenge when an organization seeks to integrate the platform into a particular organizational context and/or workflow. For example, an information technology group within a business may wish to create an optimal data handling solution that is suited to the business's particular needs, and to do so they may leverage and/or combine the different technologies supported by the platform. The disparate technologies supported by the platform may be complementary to each other and/or may operate concurrently with each other. Traditionally, for an application to combine and/or coordinate the operations of multiple technologies supported by the platform, a large amount of ad hoc and/or specialized code would need to be written. Such code would be difficult to maintain from version to version of the application as the application's design and/or logic changes. Implementations provide a unified client that acts as a single interface to interact with all the subsystems supported by a distributed processing platform, and to facilitate the consumption of the various diverse services provided by a distributed processing platform. By combining different subsystems in a single session, the unified client also operates to overcome the individual limitations (e.g., performance limitations, processing capacity, etc.) that may be inherent in each subsystem and/or technology of the distributed processing platform.

Spark technology has been designed to support long running job execution in batch mode. Spark technology supports job execution through a shell script (e.g., spark-submit). The configuration of the shell script creates its own challenges. For example, the shell script imposes many script arguments and prerequisites, such as the presence of the Hadoop XML configurations on the client side and specific Hadoop environment variables.

From a client application perspective, leveraging Spark may be difficult for various reasons. For example, Spark is difficult to embed into an application runtime landscape. The traditional way to submit a Spark job includes building a custom command line and executing the custom command line in a separate process. Moreover, a Spark job is traditionally self-contained and is executed in one shot without the possibility of returning to the client workflow (e.g., to proceed with intermediate steps) to continue the Spark job execution from the point where it was interrupted. Accordingly, in a traditional platform Spark cannot be readily used in an interactive and/or stateful manner. Moreover, traditionally a Spark connection description may not exist as a separate concept. Instead, a Spark interface may handle a Spark job submission whose configuration includes connection related information and other parameters. In addition, traditionally Spark may not provide the kind of connection repository comparable to that present in an RDBMS context. For at least these reasons, in traditional solutions a Spark interface is difficult to embed, difficult to configure, and may only handle job execution in batch mode, thus preventing intermediate interactions with the client application.

To mitigate and, in some instances, eliminate the above listed restrictions on the existing disparate interfaces in a distributed processing platform, implementations provide for enhanced service consumption in a distributed processing platform. In particular, implementations provide an operational Spark client (e.g., driver) that is embeddable, such that the Spark driver can be loaded into the application process even in a non-JVM process. In some implementations, the Spark runtime is bytecode-based and the Spark client may be configurable at runtime. The Spark driver can consume a predefined Spark connection descriptor which is persisted into a particular repository to ease the connection configuration. The Spark job runtime may be specific to each application domain. The Spark job runtime may be stored in a dedicated repository and may deployable at runtime to a (e.g., Hadoop) cluster. In some implementations, the Spark client provides an interactive and/or stateful connection. A Spark connection may be established to enable the submission of successive jobs with intermediate states which are kept in a virtual workspace. Internally, the Spark connection may correspond to a SparkContext instance.

In some implementations, at least some (or all) of the Hadoop specific client interfaces may be consolidated into a single point client component that is the unified client. The unified client enables the seamless association of various services, e.g., Hive, SparkSQL, Spark, MapReduce, etc., to fulfill a complex and/or heterogeneous data processing chain. Through the unified client, the Spark driver may be aligned at the same level of technical characteristics as the other drivers (e.g., Hive client, HDFS client, etc.).

Figure 6:
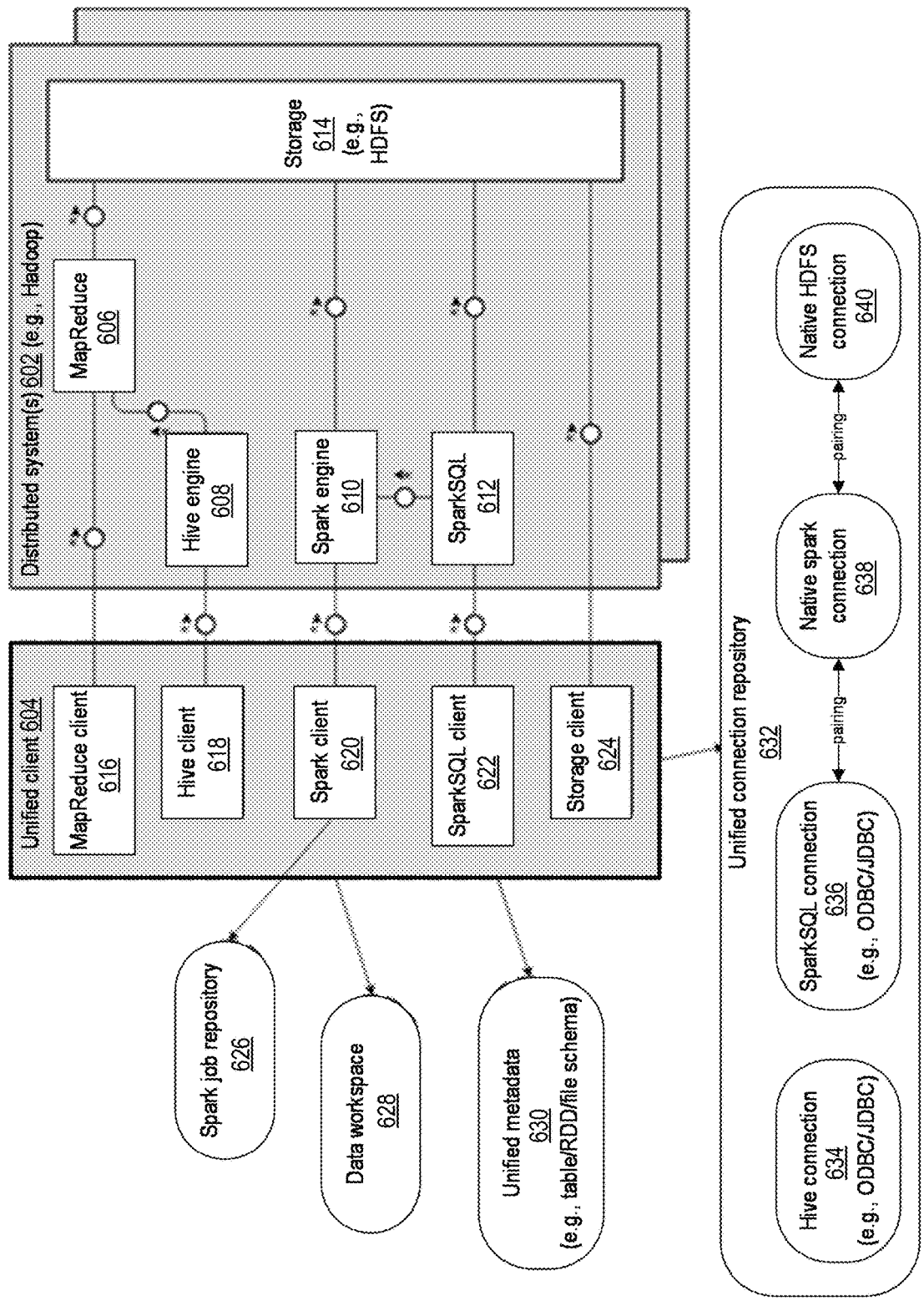
FIG. 6 depicts an example system including a unified client for a distributed processing platform, according to implementations of the present disclosure.

FIG. 6 depicts an example system including a unified client for a distributed processing platform, according to implementations of the present disclosure. As shown in the example of FIG. 6, the system may include one or more distributed systems 602 in a distributed processing platform. In some instances, the distributed system(s) 602 include Hadoop system(s). Implementations also support other types of distributed system(s) 602. The distributed system(s) 602 may include sub-systems and/or engines such as MapReduce 606, a Hive engine 608, a Spark engine 610, SparkSQL 612, and Storage 614 (e.g., HDFS).

The system may include a unified client 604. The unified client 604 may include sub-clients such as a MapReduce client 616, a Hive client 618, a Spark client 620, a SparkSQL client 622, and/or a storage client 624. The unified client 604 may also include any other appropriate type of sub-client, for example a Simple Concurrent Object-Oriented Programming (SCOOP) client. The sub-clients may also include a HDFS client. In some implementations, the sub-clients may include one or more other (e.g., generic) SQL clients to support SQL implementation(s) other than Spark SQL, such as Cloudera Impala™. Each of the various sub-clients of the unified client 604 may be configured to interface with a corresponding sub-system of the distributed system(s) 602. For example, the MapReduce client 616 may be configured to interface with MapReduce 606, the Hive client 618 may be configured to interface with the Hive engine 608, the Spark client 620 may be configured to interface with the Spark engine 610, the SparkSQL client 622 may be configured to interface with SparkSQL, and the storage client 624 may be configured to interface with storage 614.

In some implementations, the Spark client 620 may access a Spark job repository 626. The unified client 604 may access and employ a data workspace 628 and/or unified metadata 630 (e.g., table, RDD, and/or file schema). In some implementations, the unified client 604 may access a unified connection repository 632. The unified connection repository 632 may include one or more of a Hive connection 634 (e.g., employing ODBC and/or JDBC), a SparkSQL connection 636 (e.g., employing ODBC and/or JDBC), a native Spark connection 638, and/or a native HDFS connection 640. In some instances, there may be a pairing between a SparkSQL connection 636 and a native Spark connection 638. In some instances, there may be a pairing between a Native Spark connection 638 and a Native HDFS connection 640.

The unified connection repository 632 may also be described as a connection metadata repository. The unified connection repository 632 may store metadata that indicates pairings between different connections (e.g., paired connections of different types). Such pairings may enable the interface between different sub-clients such as the MapReduce client 616, the Hive client 618, the Spark client 620, the SparkSQL client 622, the storage client 624, and so forth. During a particular unified session, an application may call into multiple, different sub-clients, and may receive and/or send data through the various sub-clients. The connection pairings that are defined at the metadata level in the unified connection repository 632, enable the combination of sub-clients for use in a particular unified session. The connection pairings defined at the metadata level also enable the switching between sub-clients used during a session. For example, a session may be initiated using one sub-client (e.g., SparkSQL client) and, using the same unified session, the initial sub-client may be associated with (e.g., chained to) one or more other sub-clients may also be used. Such switching between sub-clients may be performed lazily, in that each sub-client shares a minimal common interface and therefore becomes interoperable. For example a Spark sub-client can interoperate with a Hive SQL sub-client or a HDFS client. The actual choice of sub-client may be determined at runtime by the particular session configuration. The association (e.g., chaining) between sub-clients may be performed in a seamless way, without requiring additional authorization or authentication of client credentials. Authentication can be handled by a "single sign on" approach (e.g., using Kerberos) that can authenticate a unified client session once to be used across all the sub-clients. In some implementations, the metadata and/or data issued from a given step in the chaining may not be persistently stored, and may instead be sent on to the next sub-client in the processing chain. Implementations enable the different sub-client interfaces to be combined in a seamless fashion for use during a unified session. Each sub-client may adhere to a common interface and may therefore provide interoperability between sub-clients. This is described further with reference to FIG. 8.

Figure 8:
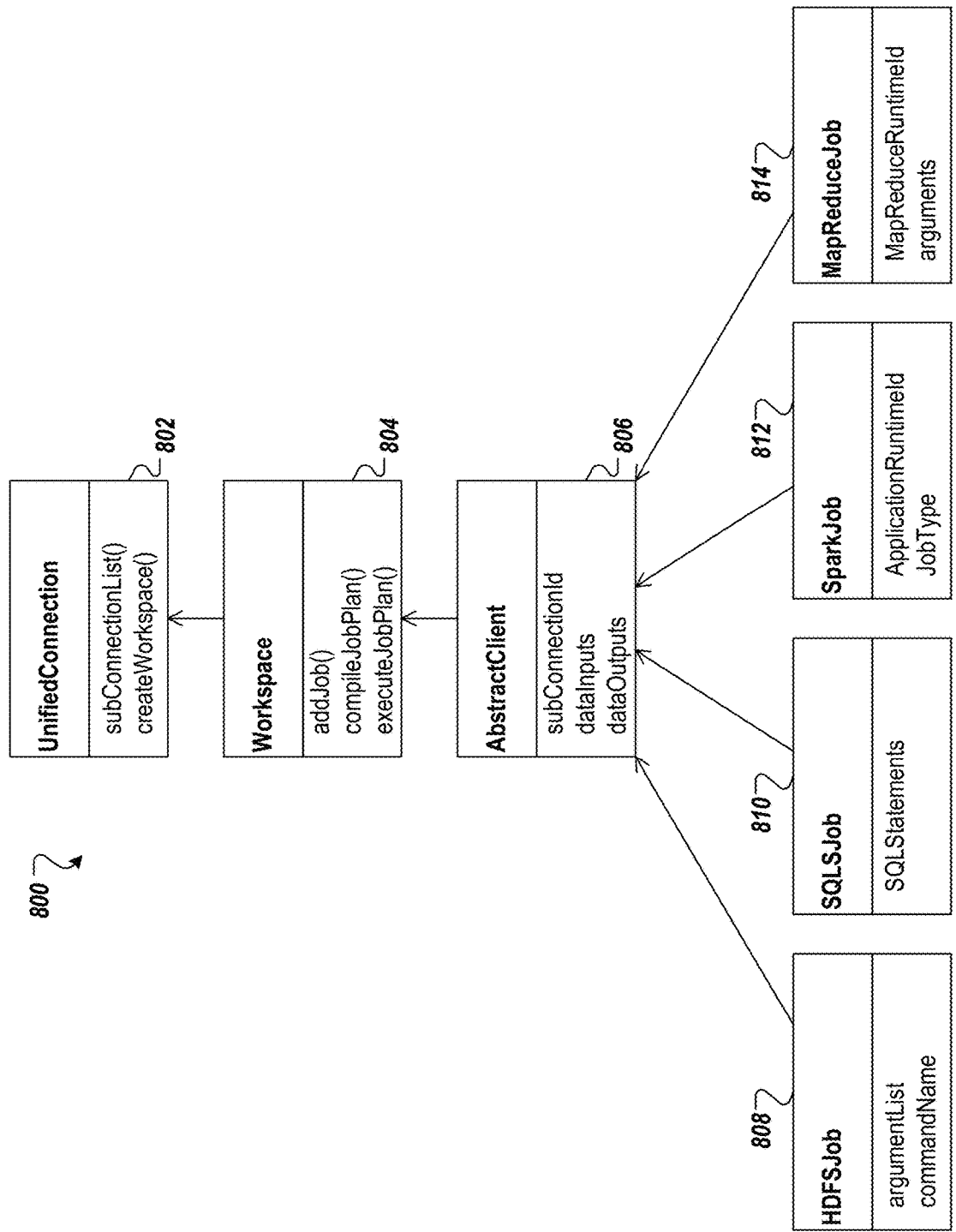
FIG. 8 depicts an example class diagram, according to implementations of the present disclosure.

FIG. 8 depicts an example class diagram 800, according to implementations of the present disclosure. In some implementations, the unified client interface may be implemented according to the class diagram 800. In the example, the class diagram 800 includes a hierarchical arrangement of classes 802, 804, 806, 808, 810, 812, and 814. As shown in the example, each class may include various member methods and member fields. For example, the UnifiedConnection class 804 includes member methods subConnectionList( ) and createWorkspace( ). In some examples, each job handles a particular sub-client, e.g., Spark SQL or HDFS. Each job, such as an instance of a HDFSJob class 808, a SQLSJob class 810, a SparkJob class 812, and/or a MapReduceJob class 814 may implement the interface AbstractClient 806. The following is an example flow of commands through such an implementation. 1) The UnifiedConnection 802 may be instantiated. 2) A stateful instance of the Workspace class 804 may be created, where staging data may reside. 3) A job may be added into the Workspace. In some instances, JSON may include the input and output parameters which may refer to existing results. 4) Job compilation may be triggered (e.g., to build the job graph based on the topological dependencies). In some instances, the system may validate that the job graph is well formed. 5) The job plan may be executed within the unified connection context. Intermediate and/or temporary data may be stored within the workspace. In the example of FIG. 8, "subConnectionId," "ApplicationRuntimeId," and/or "MapReduceRuntimeId" may refer to the unified client repository where connections are predefined and/or where Spark or MapReduce runtimes are stored.

Returning to FIG. 6, the chaining of sub-clients may include receiving data at a first sub-client, which then provides the data for processing by a second sub-client. Although examples herein may describe chaining two sub-clients together during a unified session, implementations enable the chaining of any appropriate number of sub-clients to sequentially handle data. The chaining of sub-clients may be a serial chaining in which data is passes from one sub-client to another, and then to another, and so forth. Chaining may also enable parallel processing, in which multiple sub-clients process the same data at least partly contemporaneously. The chaining may involve branching, in which processing is performed in parallel in multiple sub-clients and/or multiple chains of sub-clients. Chaining may also include the merging and/or rejoining of branches chains for further processing.

The pairing of connections may occur at runtime and may be based on a first connection referring to a second (e.g., Hadoop) subsystem such as a different sub-client than that used for the first connection. Implementations provide a unified client for combining different types of data processing technology, e.g., corresponding to the different sub-clients, to provide a more feature rich data handling solution compared to traditional solutions. Through the unified client, implementations also provide a solution that enables greater flexibility in data handling through leveraging multiple capabilities of the (e.g., Hadoop) platform.

The unified connection repository 632 may store metadata for one or more interface-specific connections. In some instances, such connections may be paired to each other only if they refer to the same sub-system of the distributed system(s) 602. In some examples, the native Spark connection description includes in YARN mode at minimum the XML Hadoop files which are deployed at runtime into the class path of the Spark runtime to properly configure the YARN and/or Hadoop components.

In some instances, the Spark client may be stored in a separate repository from the Spark job runtime packages (e.g., jar files). Such a job artifact can be executed with any Spark connections if the Spark and/or Hadoop versions are compatible.

In some implementations, the unified client 604 exposes the various individual interfaces that it includes. The unified client consumer (e.g., application) may initiate a given connection to a specific interface (e.g., the Hive client). Depending on the predefined connection pairings, the unified client consumer can automatically access other service interface(s) to build a heterogeneous data processing graph, as show in the example of FIG. 7A. In some instances, credentials may be requested to enable access to the paired connections.

Figure 7A:
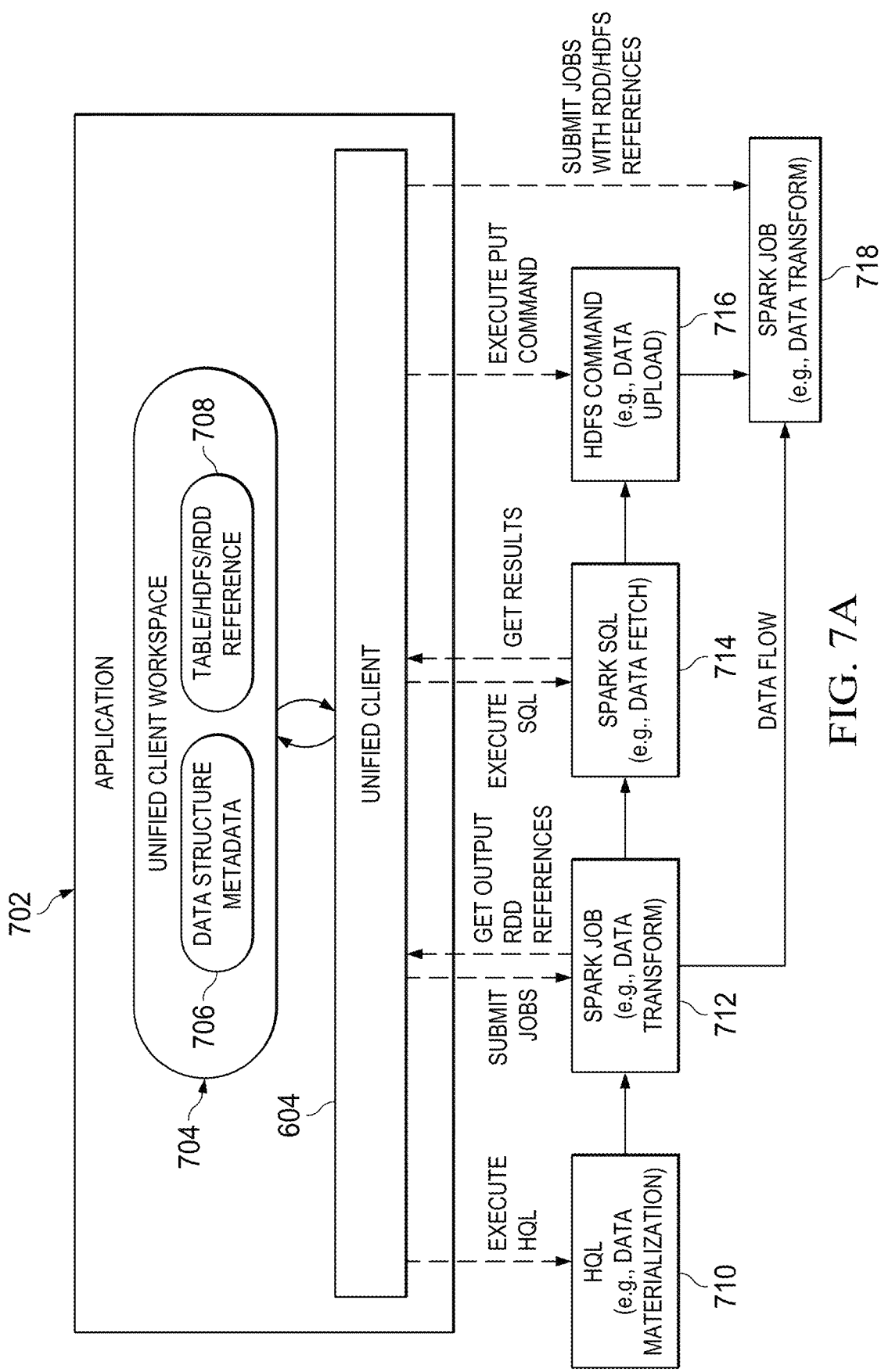
FIG. 7A depicts an example system including an application that employs a unified client, according to implementations of the present disclosure.

A unified connection (e.g., a paired set of connections) may be bound to the virtual data workspace 628, which may include state information for a unified session between the unified client 604 and the distributed system(s) 602. For example, the data workspace 628 may include state information such as one or more intermediate states that are maintained in the form of references and/or identifiers to a Hive table, an in-memory Resilient Distributed Data (RDD), a HDFS filename, and/or client side resources. Such information may enable a stateful connection to be maintained. Maintaining, in the state information, a reference to in-memory RDD may enable different jobs (e.g., Spark or otherwise) to be chained to one another. For example, a first Spark job may return a result as a RDD reference, and another job may consume that result by passing in an argument that is the RDD reference. Jobs may pass in and/or return a reference to the RDD instead of the RDD itself, given the potentially large size of the RDD. The presence of the state information in the data workspace 628 may also enable automatic cleanup to be performed at the end of a session. For example, at least some of the state information may be deleted at the end of a session, such as references (e.g., Hive table) that were created to fetch result(s) back to the unified client 604 and/or application. Implementations enable data to be passed from one processing step to another one along the data flow graph as shown in FIG. 7A.

FIG. 6 provides an example of processing chaining as shown in the unified connection repository 632. For example, a particular session of interactions between the unified client 604 and the distributed system(s) 602 may employ the Spark engine and the Hive engine in a particular way, e.g., using SparkSQL, and also leverage HDFS.

Depending on the requirements to be met in a single session handled by the components of the unified client 604, stepwise processing may include uploading of data sets produced through intermediate processing on the application side and push the data sets to the distributed system(s) 602. This may be followed by Spark processing of the data sets. The unified client 604 may enable an application to chain the performance of these various processing steps in a seamless manner. The steps may also include data preparation steps using the HiveQL language. Use of the unified client 604 eliminates the need to port such data preparation jobs into SparkSQL or other languages. For example, the unified client 604 enables an application to leverage Hive to perform the data preparation, leverage the Spark engine to perform various modeling steps, and use Hive and/or Spark to fetch the various results back to the application. The application may then perform intermediate processing of the result(s). Steps may be alternated on the unified client side and/or the distributed system(s) side. For the distributed system(s) side processing, implementations enable the combination of any number of operations in any order including operations in MapReduce, Spark, Hive, HDFS, and so forth.

Although examples herein describe the use of a unified client for use with a single distributed processing platform (e.g., Hadoop), implementations are not so limited. In some implementations, the unified client may be employed to facilitate data handling across multiple distributed processing platforms. In such instances, a unified connection repository 632 may include metadata that describes a connection pairing between two HDFS connections, e.g., to facilitate the transfer and/or copy of data from one distributed processing platform to another. In such instances, the unified client 604 may include a HDFS client as a sub-client to handle such data transport across platforms.

In some implementations, the coupling or pairing of connections may be user-specific, e.g., one or more particular associations between connections may be established and stored for a particular user. In one example, a connection pairing and/or association may be made between the following: an ODBC connection to Hive, Spark SQL, etc.; a Spark connection (e.g., including configuration files and properties); and a HDFS connection. One unified client connection may include these three connections associated together. The one unified client connection configuration may be the same for all users or there may be user-specific values to provide flexibility. For example, an ODBC connection may be general for all users, with more specified ODBC connections for user 1 and user 2. For user 1, the specific ODBC connection may include information for a Spark configuration and a HDFS configuration. For user 2, the specific ODBC connection may include information for a Spark configuration and a HDFS configuration. As another example, a general (e.g., technical user) ODBC connection may be used, but with a custom Spark configuration for user 2. For user 1, the connection may be the generic ODBC connection with Spark configuration files and HDFS configuration. For user 2, the connection may be the generic ODBC connection with Spark configuration files, a custom additional configuration for user 2, and HDFS configuration.

FIG. 7A depicts an example system including an application 702 that employs a unified client 604, according to implementations of the present disclosure. As shown in the example of FIG. 7A, the system may include an application 702. The application 702 may include the unified client 604 and a unified client workspace 704 (e.g., data workspace 628). In some instances, the unified client 604 is embedded (e.g., in process) into the application 702. For example, the unified client 604 may be loaded as a library at runtime to provide, to the application 702, interface capabilities into the various sub-systems of the distributed system(s) 602.

In some instances, the unified client workspace 704 includes data structure metadata 706 and one or more references 708 to a table, HDFS, and/or RDD. The unified client 604 may be configured to access and employ the unified client workspace 704 to perform its various operations. The unified client 604 may execute one or more queries in HQL 710 (e.g., for data materialization). The unified client 604 may submit jobs such as a Spark job 712 (e.g., for data transform), and receive the output RDD references from the Spark job 712. The unified client 604 may execute SQL such as SparkSQL 714 (e.g., for data fetch), and receive result(s) from the SparkSQL 714. The unified client 604 may execute a PUT command through HDFS command 716 (e.g., for data upload). The unified client 604 may submit jobs with RDD and/or HDFS reference(s) to a Spark job 718 (e.g., for data transform).

In some instances, each data reference hosted by the workspace 704 has metadata that describe its structure. The unified client 604 may be configured to manage multiple connections to different sub-systems of the distributed system(s) 602 (e.g., Hadoop). If the unified client consumer needs to construct a data processing graph across sub-systems, the unified client 604 provides for transitional data in a staging area which is part of the data workspace. After a unified connection is closed, the temporary workspace content may be cleaned up automatically by the unified client component.

The unified client 604 may provide, to an application or other consumer, a single point of access to the distributed system(s) 602. The various sub-systems of the distributed system(s) 602 may provide different benefits, and the unified client 604 may enable an application to leverage and/or combine the different benefits of each sub-system in a seamless, efficient manner without the need for a large amount of ad hoc specific coding to be performed.

The unified client 604 enables the creation of a unified session for the application 702 to interface with the distributed system(s) 602. When a unified session is created from the unified client 604, the unified client 604 may create a unified connection that pairs and/or otherwise combines different individual connection types (e.g., to Hive, Spark, HDFS, MapReduce, etc.). To accomplish this unified connection, implementations may specify a native Spark connection description as a set of schema.

Traditionally, a Spark connection is facilitated through use of a shell script which does not separate the establishment of the connection from job submission. In some implementations, the task of establishing a Spark connection may be separate from the task of job submission. Traditionally, Spark is configured to enable jobs to be run in a batch mode and Spark does not enable interactive sessions. In some implementations, the unified client 604 enables interactive Spark sessions between the application 702 and the distributed system(s) 602. For example, the unified client 604 may cause the distributed system(s) 602 to initiate a Spark job, interrupt the job to perform some intermediate step(s), and cause the Spark job to be resumed after the intermediate step(s) are performed.

Traditionally, information describing a Spark connection may be inconveniently located in multiple locations, such as XML files, Hadoop variables, and so forth. In some implementations, a single Spark connection descriptor may include the various Spark connection information, providing a more convenient way for a client to readily access the Spark connection information. The Spark connection descriptor may be in the Spark job repository 626. The unified client 604 may access the Spark job repository 626 to access the Spark connection descriptor and create and/or restore a Spark connection based on the connection information therein. In this way, implementations provide a unified client 604 that effectively treats Spark similarly to other engines supported by the distributed system(s) 602, thus facilitating the application's use of Spark for processing. The unified client 604 provides a single interface that enables the application 702 may interact with the various sub-systems in a similar manner, instead of requiring ad hoc and/or specialized code to be written to interact with each different sub-system.

The particular chaining of sub-clients shown in FIG. 7A, e.g., HQL 710 to Spark job 712 to SparkSQL 714, etc., is provided as an example, and implementations are not limited to this example. In general, any suitable number and type of sub-clients may be chained in any order, in serial and/or in parallel, to perform data processing. In the example of FIG. 7A, the spark job 712 processes data and provides results of the processing to both SparkSQL 714 and another spark job 718, as an example of branching for parallel processing as described above. Particular sub-clients may be employed to perform particular types of operations during an instance of chaining. For example, certain sub-clients may be used to retrieve data from storage, whereas other sub-clients may be used to transform the data in some way. After a processing step has been performed, some metadata may be returned to the unified client 604 to indicate a result of the processing or to indicate that processing has been performed. Such returned metadata may include a reference to the results, such as the output RDD references shown in FIG. 7A as returned from the Spark job 712. Results of various processing steps performed by the various sub-clients may be associated with one another through use of references.

Figure 7B:
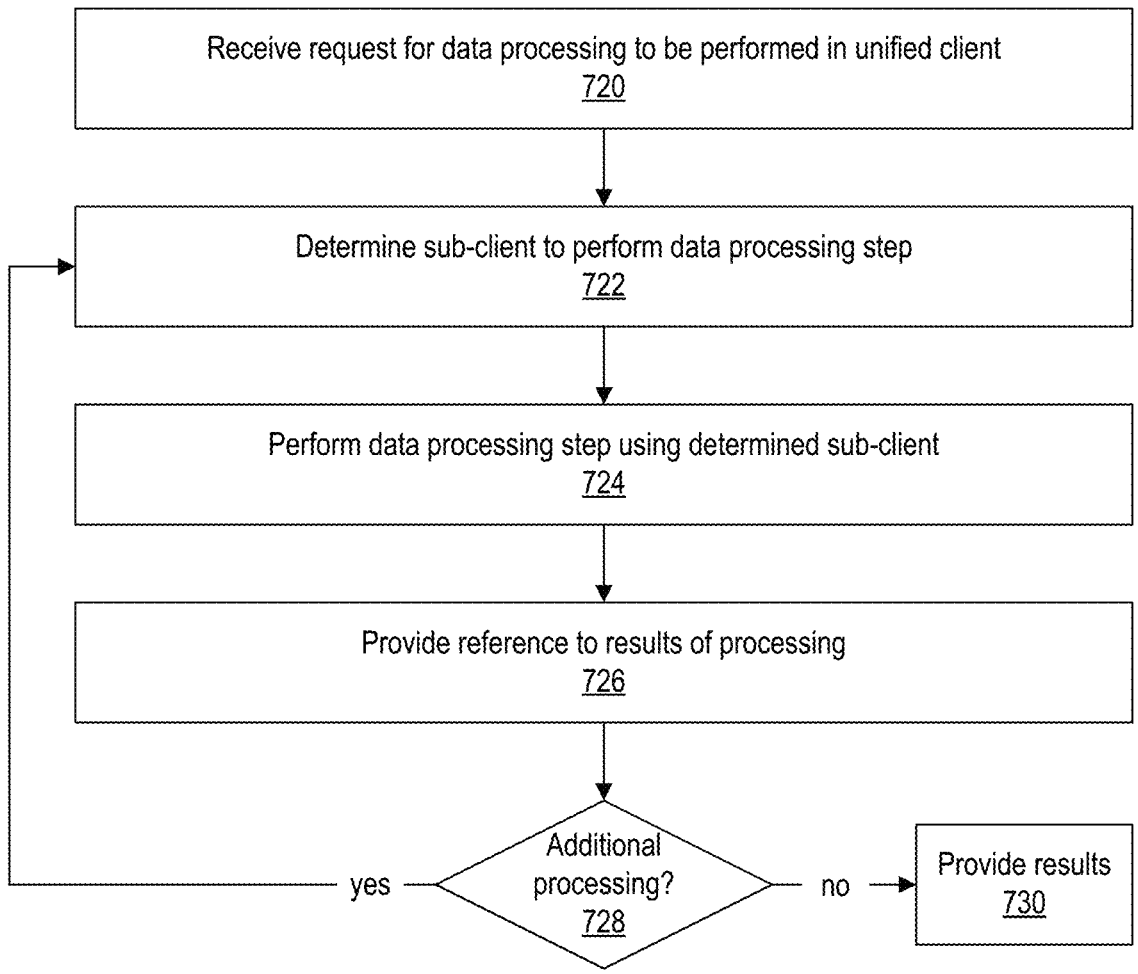
FIG. 7B depicts an example flow diagram of a process for employing a unified client for data processing, according to implementations of the present disclosure.

FIG. 7B depicts an example flow diagram of a process for employing a unified client for data processing, according to implementations of the present disclosure. Operations of the process may be performed by the application 702, the unified client 604, and/or other software modules executing on a client computing device, device(s) of the distributed processing platform, or elsewhere.

A request is received (720), indicating data processing to be performed in a distributed processing platform using the unified client 604. In some instances, the request may be received from the application 702 calling into the unified client 604.

A sub-client of the unified client 604 is determined (722) to perform the data processing step. In some instances, the flow and chain of data processing can be pre-determined to solve a particular problem. In some instances, the flow and chain of data processing can be determined at runtime through flexible input configuration and/or based on the results of data processing. For example, if a dataset is determined to be trivial (e.g., lower cost) to process in one sub-client relative to another, that choice of the lower cost sub-client can be made at runtime. The data processing step is performed (724) using the determined sub-client, and the results may be provided for further processing. In some implementations, a reference may be provided (726) pointing to the results, so that other sub-clients may perform further processing steps on the resulting data.

A determination is made (728) whether additional processing is needed. If not, the results of the last processing step may be provided (730), e.g., to the application 702. If further processing is needed, the process may return to 722 and determine another sub-client that is a same or different sub-client than that used in the previous step. Processing steps may be performed serially by a sequence of (same or different) sub-clients, and/or processing steps may be performed in parallel by multiple sub-clients of a same or different type.

In some instances, at least some data processing may be performed on the client side, e.g., outside the distributed processing platform. For example, results may be received back from the Hadoop processor, through the Get Results flow shown in FIG. 7A. Local processing may be performed on the received results, and the results of the local processing may be sent for further processing by other sub-clients. Implementations enable at least some of the processing steps to be performed outside of the distributed processing platform (e.g., the Hadoop system).

Example Computing Device

Figure 5:
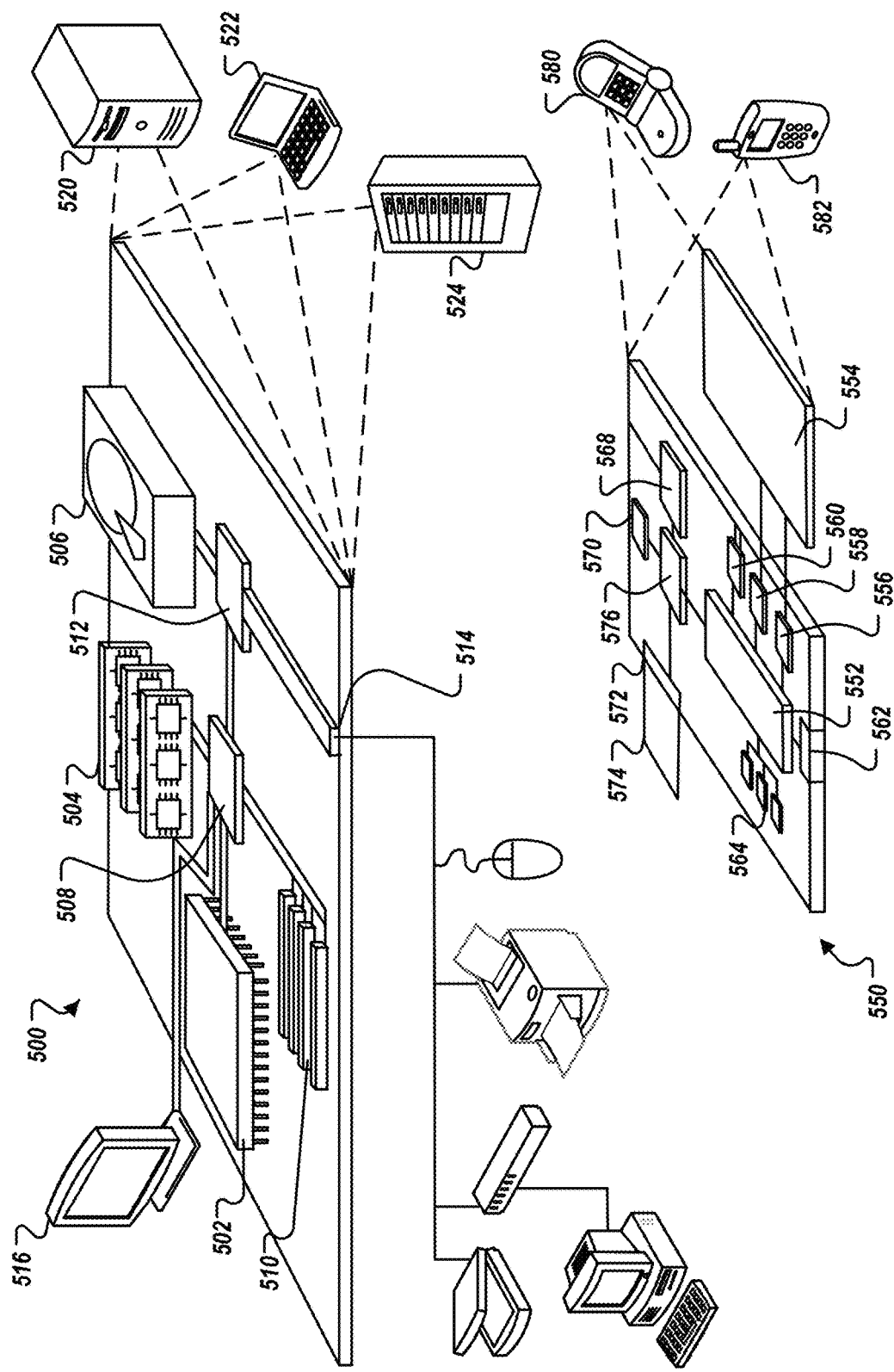
FIG. 5 depicts an example computing system that may be used to implement the techniques described herein.

FIG. 5 shows an example of a computer device 500 and a mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit the implementations described and/or claimed in this document. At least one computing device 500 and/or 550, or one or more components thereof, may be included in any of the computing devices, systems, and/or platforms described herein.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 648 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   identifying, by the at least one processor, an input training dataset stored within a data warehouse of a distributed processing platform that includes a plurality of sub-systems;
   transmitting, by the at least one processor, instructions from a client application to the distributed processing platform to request that at least one of the plurality of sub-systems be executed to perform a first set of data processing steps to determine a predictive model based on the input training dataset, each of the at least one of the plurality of subs-systems executing within a cluster and receiving at least a portion of the input training dataset from the data warehouse, wherein the first set of data processing steps includes slicing the input training dataset to determine one or more slices, and scoring the predictive model with respect to the one or more slices to calculate cross statistics for the predictive model;
   receiving, by the client application and from the data warehouse, a first set of results of the first set of data processing steps performed by the at least one of the plurality of sub-systems of the distributed processing platform, the first set of results comprising metadata associating results with one another based on references, the first set of results being stored in the data warehouse by respective sub-systems, wherein model results for the prediction model from the first set of results for a first slice from the one or more slices are compared to model results for the prediction model from the first set of results for another slice from the one or more slices, and wherein the first set of results include the cross statistics calculated for the sliced input data that include calculating statistics about distribution of an input variable value against a target variable to reduce the number of input variables for training the prediction model;

executing, by the client application, local processing based on the first set of results to determine a second set of data processing steps for execution at the at least one of the plurality of sub-systems of the distributed processing platform to determine the predictive model, wherein the second set of data processing steps is determined based a performance evaluation of the predictive model;

receiving, by the client application and from the data warehouse, a second set of results of the second set of data processing steps performed by sub-systems of the distributed processing platform, the second set of results being stored in the data warehouse by respective sub-systems;

executing, by the client application, local processing based on the second set of results to determine whether an additional set of data processing steps are to be performed to determine the predictive model; and providing, by the client application, the predictive model to determine one or more results each associated with a probability of occurrence of a value in a dataset.

2. The computer-implemented method of claim 1, wherein the instructions are sent from the client application to the distributed processing platform through a unified client that includes a plurality of sub-clients each configured to interface with a respective sub-system of the distributed processing platform.

3. The computer-implemented method of claim 1, further comprising:

executing, by the at least one processor, at least one local data processing operation on the client application to determine the predictive model;

wherein the at least one local data processing operation accepts input including a set of results from the first set of data processing steps performed on the distributed processing platform.

4. The computer-implemented method of claim 1, wherein the method is independent of data transfer of the input training dataset from the distributed processing platform.

5. The computer-implemented method of claim 1, wherein the first set of data processing steps includes calculating one or more statistics associated with the input training dataset to reduce a number of variables for generating the predictive model.

6. The computer-implemented method of claim 5, wherein the first set of data processing steps further includes re-calculating the one or more statistics based on the one or more results.

7. The computer-implemented method of claim 1, wherein the first set of data processing steps includes encoding data of the input training dataset including converting alphanumeric data to numeric data.

8. The computer-implemented method of claim 1, wherein the first set of data processing steps includes performing a co-variance matrix calculation and a matrix inversion calculation with respect to the input training dataset.

9. The computer-implemented method of claim 1, wherein the first set of data processing steps includes iteratively evaluating a performance of the predictive model based on a structural risk minimization.

10. A system comprising:
at least one processor; and
a memory communicatively coupled to the at least one processor, the memory storing instructions which, when executed by the at least one processor, cause the at least one processor to perform operations comprising:

identifying an input training dataset stored within a data warehouse of a distributed processing platform that includes a plurality of sub-systems;

transmitting, by the at least one processor, instructions from a client application to the distributed processing platform to request that at least one of the plurality of sub-systems be executed to perform a first set of data processing steps to determine a predictive model based on the input training dataset, each of the at least one of the plurality of subs-systems executing within a cluster and receiving at least a portion of the input training dataset from the data warehouse, wherein the first set of data processing steps includes slicing the input training dataset to determine one or more slices, and scoring the predictive model with respect to the one or more slices to calculate cross statistics for the predictive model;

receiving, by the client application and from the data warehouse, a first set of results of the first set of data processing steps performed by the at least one of the plurality of sub-systems of the distributed processing platform, the first set of results comprising metadata associating results with one another based on references, the first set of results being stored in the data warehouse by respective sub-systems, wherein model results for the prediction model from the first set of results for a first slice from the one or more slices are compared to model results for the prediction model from the first set of results for another slice from the one or more slices, and wherein the first set of results include the cross statistics calculated for the sliced input data that include calculating statistics about distribution of an input variable value against a target variable to reduce the number of input variables for training the prediction model;

executing, by the client application, local processing based on the first set of results to determine a second set of data processing steps for execution at the at least one of the plurality of sub-systems of the distributed processing platform to determine the predictive model, wherein the second set of data processing steps is determined based a performance evaluation of the predictive model;

receiving, by the client application and from the data warehouse, a second set of results of the second set of data processing steps performed by sub-systems of the distributed processing platform, the second set of results being stored in the data warehouse by respective sub-systems;

executing, by the client application, local processing based on the second set of results to determine whether an additional set of data processing steps are to be performed to determine the predictive model; and providing, by the client application, the predictive model to determine one or more results each associated with a probability of occurrence of a value in a dataset.

11. The system of claim 10, wherein the instructions are sent from the client application to the distributed processing platform through a unified client that includes a plurality of sub-clients each configured to interface with a respective sub-system of the distributed processing platform.

12. The system of claim 10, the operations further comprising:
   executing at least one local data processing operation on the client application to determine the predictive model;
   wherein the at least one local data processing operation accepts input including a set of results from the first set of data processing steps performed on the distributed processing platform.

13. One or more non-transitory computer-readable storage media storing instructions which, when executed by at least one processor, cause the at least one processor to perform operations comprising:
   identifying an input training dataset stored within a data warehouse of a distributed processing platform that includes a plurality of sub-systems;
   transmitting, by the at least one processor, instructions from a client application to the distributed processing platform to request that at least one of the plurality of sub-systems be executed to perform a first set of data processing steps to determine a predictive model based on the input training dataset, each of the at least one of the plurality of subs-systems executing within a cluster and receiving at least a portion of the input training dataset from the data warehouse, wherein the first set of data processing steps includes slicing the input training dataset to determine one or more slices, and scoring the predictive model with respect to the one or more slices to calculate cross statistics for the predictive model;
   receiving, by the client application and from the data warehouse, a first set of results of the first set of data processing steps performed by the at least one of the plurality of sub-systems of the distributed processing platform, the first set of results comprising metadata associating results with one another based on references, the first set of results being stored in the data warehouse by respective sub-systems, wherein model results for the prediction model from the first set of results for a first slice from the one or more slices are compared to model results for the prediction model from the first set of results for another slice from the one or more slices, and wherein the first set of results include the cross statistics calculated for the sliced input data that include calculating statistics about distribution of an input variable value against a target variable to reduce the number of input variables for training the prediction model;
   executing, by the client application, local processing based on the first set of results to determine a second set of data processing steps for execution at the at least one of the plurality of sub-systems of the distributed processing platform to determine the predictive model, wherein the second set of data processing steps is determined based a performance evaluation of the predictive model;
   receiving, by the client application and from the data warehouse, a second set of results of the second set of data processing steps performed by sub-systems of the distributed processing platform, the second set of results being stored in the data warehouse by respective sub-systems;
   executing, by the client application, local processing based on the second set of results to determine whether an additional set of data processing steps are to be performed to determine the predictive model; and
   providing, by the client application, the predictive model to determine one or more results each associated with a probability of occurrence of a value in a dataset.

14. The one or more non-transitory computer-readable storage media of claim 13, wherein the first set of data processing steps includes calculating one or more statistics associated with the input training dataset to reduce a number of variables for generating the predictive model.

15. The one or more non-transitory computer-readable storage media of claim 14, wherein the first set of data processing steps further includes re-calculating the one or more statistics based on the one or more results.

16. The one or more non-transitory computer-readable storage media of claim 13, wherein the first set of data processing steps includes performing a co-variance matrix calculation and a matrix inversion calculation with respect to the input training dataset.

* * * * *